United States Patent [19]

Ono et al.

[11] Patent Number: 5,464,693
[45] Date of Patent: Nov. 7, 1995

[54] STRUCTURE FOR INSTALLING MIRROR BASE ON GLASS PLATE AND METHOD FOR INSTALLING MIRROR BASE ON GLASS PLATE

[75] Inventors: Michio Ono; Masaharu Kume, both of Yokohama; Takayuki Matsuo, Aikawa, all of Japan

[73] Assignee: Asahi Glass Company Ltd., Tokyo, Japan

[21] Appl. No.: 889,417

[22] Filed: May 28, 1992

Related U.S. Application Data

[62] Division of Ser. No. 434,673, Sep. 19, 1989, Pat. No. 5,160,780.

[30] Foreign Application Priority Data

| Dec. 24, 1987 | [JP] | Japan | 325182 |
| Sep. 2, 1988 | [JP] | Japan | 220205 |
| Oct. 4, 1988 | [JP] | Japan | 129555 |

[51] Int. Cl.⁶ .......... C08G 77/06; B32B 17/10; G02B 7/18
[52] U.S. Cl. .......... 428/344; 428/220; 428/429; 428/437; 428/447; 359/883; 359/870; 528/15
[58] Field of Search .......... 428/220, 344, 428/429, 437, 447, 448; 528/15; 350/631; 359/871, 883, 870

[56] References Cited

U.S. PATENT DOCUMENTS

| 3,130,103 | 4/1964 | Mattimoe et al. | 350/631 X |
| 4,082,726 | 4/1978 | Mine et al. | 428/447 X |
| 4,122,246 | 10/1978 | Sierawski | 528/15 |
| 4,170,688 | 10/1979 | Roentgen et al. | 428/437 X |
| 4,196,273 | 4/1980 | Imai et al. | 528/15 |
| 4,242,403 | 12/1980 | Mattimoe et al. | 428/447 X |
| 4,281,093 | 7/1981 | Garden | 528/15 |
| 5,064,722 | 11/1991 | Swofford et al. | 428/437 |
| 5,160,780 | 11/1992 | Ono et al. | 428/220 |
| 5,216,069 | 6/1993 | Kobori | 428/447 X |

FOREIGN PATENT DOCUMENTS

| 015346 | 9/1980 | European Pat. Off. . |
| 304676 | 3/1989 | European Pat. Off. . |
| 1120476 | 7/1968 | United Kingdom . |

Primary Examiner—George F. Lesmes
Assistant Examiner—Blaine R. Copenheaver
Attorney, Agent, or Firm—Oblon, Spivak, McClelland, Maier & Neustadt

[57] ABSTRACT

This invention relates to a mirror base-installing structure for installing a mirror base on the surface of a glass plate, characterized in that said mirror base is bonded to the surface of said glass plate with a film-like or sheet-like heat-curable adhesive interposed between the mirror base and the glass plate, said adhesive having elasticity or plasticity after heat-cured, and a method for installing the same. The mirror base can be bonded simultaneously with the preparation of a bilayer glass, thereby simplifying the working process.

5 Claims, 2 Drawing Sheets

STRUCTURE FOR INSTALLING MIRROR BASE ON GLASS PLATE AND METHOD FOR INSTALLING MIRROR BASE ON GLASS PLATE

SPECIFICATION

This application is a Divisional of application Ser. No. 07/434,673, filed Sep. 19, 1989, now U.S. Pat. No. 5,160,780; which was filed as International Application No. PCT/JP88/01320 on Dec. 23, 1988.

TECHNICAL FIELD

This invention relates to a structure for installing a mirror base on a glass plate, particularly a mirror base-installing structure suitable for installing an inner mirror on a front window-shield glass of an automobile in the inside of the automobile, and a method for installing a mirror base on a glass plate.

BACKGROUND ART

As shown in FIG. 7, an inner mirror such as a room mirror, back mirror or the like is installed at the upper position in front of a driver in the inside of an automobile occasionally by using a method whereby a mirror base 41 is installed on the inner side surface 44 of a front wind-shield glass 43 with an adhesive 42 and an inner mirror 45 is attached to the mirror base 41. It is known to use a paste-like silicone rubber adhesive or a polyurethane rubber adhesive having a fluidity and also having excellent heat-resistance, durability and weather-resistance or a thermoplastic polyvinyl butyral film for bonding an inner mirror base of an automobile to the surface of a front wind-shield glass. Particularly, the thermoplastic polyvinyl butyral film is widely used in European and American countries since it can be easily and conveniently bonded simultaneously with the preparation of a bilayer glass.

However, the polyvinyl butyral film has a disadvantage that it has a property of easily absorbing moisture, and its adhesive force lowers substantially upon absorption of moistures, whereby the attached inner mirror is likely to fall off naturally by a shock or the like during driving. For this reason, a dealer must take the trouble to always prepare an adhesive for an accidental falling off. Furthermore, the polyvinyl butyral film has another disadvantage that it becomes too soft to retain its adhesive force because of the thermoplasticity, thereby the inner mirror naturally falling off when the temperature of a wind-shield rises to a temperature from 60° C. to 80° C.

Moreover, the paste-like adhesive such as polyurethane or silicone rubber has an unsatisfactory external appearance, and also has a problem that a bonding operation including a finish work during the bonding step and a finish work after curing the adhesive, is complex since a mirror base is installed on a window-shield by coating the adhesive on a mirror base and then attaching the adhesive-coated mirror base to the window-shield. Particularly, in the case of the polyurethane type adhesive having a poor UV ray-shielding property, a bonding step is more complicated since a mirror base is installed on a glass plate by coating a black type ceramic color frit on the glass plate, baking the coating and then bonding the mirror base to the glass plate through the baked black type ceramic color frit layer interposed therebetween to shield UV ray of the sun's rays. Furthermore, in the case of using the polyurethane adhesive different from the case of using the polyvinyl butyral film, it is impossible to bond the mirror base simultaneously with the preparation of a bilayer glass, and there is a fear that its manufacturing cost is increased since an independent manufacturing step and equipment are required.

An object of this invention is to provide a structure for installing a mirror base on a glass plate and a method of installing the mirror base on the glass plate, which do not have the above-mentioned disadvantages of the prior art.

DISCLOSURE OF THE INVENTION

This invention provides a mirror base-installing structure for installing a mirror base on a glass plate, characterized in that said mirror base is bonded to said glass plate with a film-like or sheet-like heat-curable adhesive interposed between the mirror base and the glass plate, said adhesive having elasticity or plasticity after heat-cured, and a method for installing a mirror base on a glass plate, characterized by interposing a film-like or sheet-like heat-curable adhesive, which provides elasticity or plasticity after heat-cured, between said glass plate and said mirror base to be bonded, and completing the bonding in an autoclave.

A preferable film-like or sheet-like adhesive used in this invention is cross-linkable at a temperature from 50° C. to 200° C. within from 5 to 60 minutes, said adhesive having the following physical properties after cross-linked:
Hardness (JIS-A): from 30 to 90,
Modulus at the elongation of 50% tensed by dumbbell (ASTMD-1822): from 5 to 50 kg/cm$^2$,
Breaking strength: from 30 to 400 kg/cm$^2$ and
Breaking elongation: from 100 to 1,000%.

Further, the film-like or sheet-like adhesive preferably has the following physical properties in the atmosphere of 20° C.:
Tensile strength by dumbell No. 3 (JIS K6301): from 80 to 120 kg/cm$^2$,
Breaking elongation: from 250 to 600%,
Shore hardness: from 50 to 90 kg/cm$^2$ and
Shear strength: from 40 to 90 kg/cm$^2$.

Still further, a preferable film-like or sheet-like adhesive used in the present invention is an adhesive prepared by molding a silicone rubber composition into a film-like or sheet-like shape, particularly an adhesive prepared by molding the following silicone rubber composition into a film-like or sheet-like shape, said silicone rubber composition comprising:
(A) organopolysiloxane having at least two alkenyl groups bonded to silicon atoms per molecule
    100 parts by weight,
(B) organohydrogen-polysiloxane having at least two hydrogen atoms bonded to silicon atoms per molecule:
    an amount so as to provide a molar ratio of hydrogen atom bonded to silicon atom in this Component (B)/alkenyl group in said Component (A) in the range of from 0.5/1 to 5/1,
(C) wet process type hydrophobic reinforcing silica having a specific surface area of at least 200 m$^2$/g, which comprises SiO$_2$ unit and organosiloxane unit selected from the group consisting of R$_3$SiO$_{1/2}$ unit, R$_2$SiO unit, RSiO$_{3/2}$ unit and a mixture thereof (wherein each R is a substituted or non-substituted monovalent hydrocarbonyl group), provided that a molar ratio of organosiloxane unit/SiO$_2$ unit is from 0.08 to 2.0:
    from 30 to 150 parts by weight,
(D) acryl-functional silane coupling agent or methacryl-functional silane coupling agent:

from 0.05 to 10 parts by weight,
(E) epoxy-functional silane coupling agent:
from 0.05 to 10 parts by weight,
(F) partially allyl etherified polyhydric alcohol:
from 0 to 5 parts by weight,
(G) platinum type compound catalyst:
an amount effective to cure the silicone rubber composition.

As mentioned above, the silicone rubber composition prepared by blending the specific wet process type silica and the specific compounds has such a satisfactory tensile strength that it can be made film-like or sheet-like, and has also an excellent adhesive property.

BEST MODE FOR CARRYING OUT THE INVENTION

Figure 1:
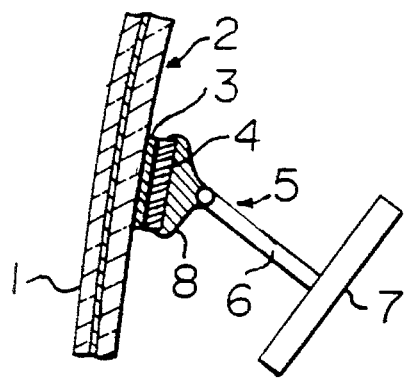
FIGS. 1 and 6 are vertical sectional views illustrating the main part of a structure for installing an inner mirror by bonding a mirror base in accordance with this invention as one embodiment.
Figure 2:
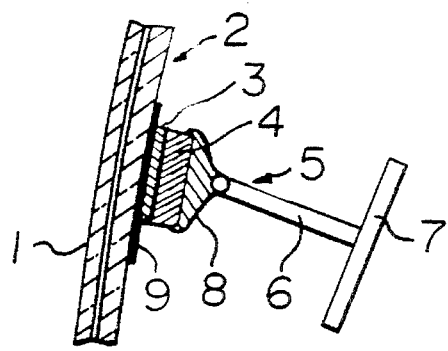
FIG. 2 is a vertical sectional view illustrating a modified Example of the embodiment as illustrated in FIG. 1.

FIGS. 1 and 2 illustrate a structure example wherein a mirror base 4 is bonded to a glass plate 2 such as a wind-shield comprising a laminated glass 1 in an autoclave by interposing a film-like or sheet-like adhesive 3 between the mirror base 4 and the glass plate surface 2, and an inner mirror 5 is fixed on the mirror base 4 thus bonded, said adhesive in the form of film or sheet being heat-curable and providing elasticity or plasticity after heat-cured. Particularly, FIG. 1 is a vertical sectional view illustrating an embodiment wherein a mirror base 4 is directly bonded to the surface of a glass plate 2 such as a wind-shield through a film-like or sheet-like adhesive 3 and an inner mirror 5 is installed on said mirror base 4 through an installing part 8, said inner mirror 5 having a supporting arm 6, one end of which has a mirror 7 and the other end of which is supported on the installing part 8 in such a manner as to be freely movable.

Further, FIG. 2 is a vertical sectional view illustrating a modified Example of the embodiment as illustrated in FIG. 1, wherein a mirror base 4 is bonded with a glass plate 2 such as a wind-shield in such a manner as to be invisible from the outside of an automobile by forming a ceramic frit baking layer 9 colored with an opaque color such as black on the glass plate 2 and then bonding the mirror base 4 to the colored ceramic frit baking layer 9 with a film-like or sheet-like adhesive 3 interposed therebetween.

The film-like or sheet-like adhesive 3 used in the present invention is cross-linkable at a temperature from 50° C. to 200° C. within from 5 minutes to 60 minutes, and the adhesive 3 after cross-linked preferably has the following physical properties:
Hardness (JIS-A): from 30 to 90,
Modulus at the elongation of 50% tensed by dumbbell (ASTMD-1822): from 5 to 50 kg/cm$^2$,
Breaking strength: from 30 to 400 kg/cm$^2$, and
Breaking elongation: from 100 to 1,000%

Concrete Examples of the adhesive preferably used, include thermo-cross linkable type ethylene-vinyl acetate copolymer resin (hereinafter referred to as "EVA"), thermo-setting type, i.e. thermo-cross linkable type silicone rubber, thermo-cross linkable type ionomer resin, polyamide resin and the like. Particularly, it is preferable to use a film-like or sheet-like adhesive prepared by molding thermo-cross linkable type ethylene-vinyl acetate copolymer resin or thermo-setting silicone rubber composition having excellent moisture-resistance, heat-resistance and thermostability.

Among them, particularly preferable silicone rubber composition molded into a film-like or sheet-like shape comprises the following components (A) to (G).

[COMPOSITION OF SILICONE RUBBER COMPOSITION]

(A) organopolysiloxane having at least two alkenyl groups bonded to silicon atoms per molecule
100 parts by weight,
(B) organohydrogen-polysiloxane having at least two hydrogen atoms bonded to silicon atoms per molecule: an amount so as to provide a molar ratio of hydrogen atom bonded to silicon atom in this Component (B)/alkenyl group in said Component (A) in the range of from 0.5/1 to 5/1,
(C) wet process type hydrophobic reinforcing silica having a specific surface area of at least 200 m$^2$/g, which comprises SiO$_2$ unit and organosiloxane unit selected from the group consisting of R$_3$SiO$_{1/2}$ unit, R$_2$SiO unit, RSiO$_{3/2}$ unit and a mixture thereof (wherein each R is a substituted or non-substituted monovalent hydrocarbonyl group), provided that a molar ratio of organosiloxane unit/SiO$_2$ unit is from 0.08 to 2.0:
from 30 to 150 parts by weight,
(D) acryl-functional silane coupling agent or methacryl-functional silane coupling agent:
from 0.05 to 10 parts by weight,
(E) epoxy-functional silane coupling agent:
from 0.05 to 10 parts by weight,
(F) partially allyl etherified polyhydric alcohol:
from 0 to 5 parts by weight,
(G) platinum type compound catalyst:
an amount effective to cure the silicone rubber composition.

In the composition of the above-mentioned sheet-like silicone rubber adhesive convenient for bonding an inner mirror base, the component (A), i.e. organopolysiloxane is the main component, and preferably has a viscosity of not higher than 1,000,000 centipoise at 25° C. so as to be easily mixed with the other components and to provide desirable adhesive properties. The component (B), i.e. organohydrogen-polysiloxane works as a cross-linking agent for the silicone rubber adhesive composition to cure the composition by reacting with the component (A).

The molar ratio of hydrogen atom bonded to silicon atom in the component (B)/alkenyl group in the component (A) is preferably in the range of from 0.5/1 to 5/1. If the molar ratio is less than 0.5/1, the curing by cross-linking is not sufficient, while if the molar ratio is higher than 5/1, the cured product becomes too hard. Thus, a preferable amount added is such an amount as to provide the molar ratio of from 0.8/1 to 3/1.

The component (C), i.e. wet type hydrophobic reinforcing silica, provides a molar ratio of organosiloxane unit/$SiO_2$ unit in the range of from 0.08 to 2.0, preferably from 0.08 to 1.5. If the molar ratio is less than 0.08, the adhesive properties are lowered and the preservation stability is also lowered. On the other hand, if the molar ratio exceeds 2.0, the reinforcing property is remarkably lowered. This silica should desirably have a specific surface area of at least 200 $m^2/g$, preferably at least 300 $m^2/g$. The silica is added in an amount in the range of from 30 to 150 parts by weight, preferably from 40 to 100 parts by weight per 100 parts by weight of the component (A). The components (D), (E) and (F) provide an adhesive property, and the component (D) is added in an amount from 0.05 to 10 parts by weight, preferably from 0.1 to 3 parts by weight per 100 parts by weight of the component (A). The component (F) is added in an amount from 0 to 1.5 parts by weight, preferably 0.01 to 2 parts by weight per 100 parts by weight of the component (A). The component (G), i.e. a platinum type compound catalyst, is a catalyst for curing said silicone rubber adhesive, and is added preferably in an amount from 0.1 ppm to 100 ppm to the component (A).

In the above-mentioned silicone rubber composition, the component (A) is reacted with the component (B) by addition reaction to cure, and the component (B) works as a cross-linking agent for the composition. The component (C) is a reinforcing agent, and works to maintain the thickness of a molded body to be easily handled before curing and to provide an appropriate hardness after curing. The components (D), (E) and (F) are indispensable components for providing an adhesive property with a metal as a base material in the claim. The component (D), is the main component for enhancing an adhesive strength, but the adhesive strength is remarkably improved by using the components (E) and (F) in combination.

A film-like or sheet-like molded silicone rubber composition should have a tensile strength at 25° C. during being uncured in the range from 1.5 $kg/cm^2$ to 5.0 $kg/cm^2$ (by dumbbell No. 3 in accordance with JIS K6301), preferably 2.0 $kg/cm^2$ to 4.0 $kg/cm^2$. If the tensile strength is not higher than 1.5 $kg/cm^2$ it becomes hard to handle the composition because it easily deforms. On the contrary, if the tensile strength is not lower than 5.0 $kg/cm^2$, the composition becomes too hard during preservation, thus losing its plasticity.

After curing an adhesive composition to such an extent as to become suitable for bonding an inner mirror base, the adhesive composition should desirably have physical properties such as a tensile strength by dumbbell No. 3 of 60 to 140 $kg/cm^2$, a breaking elongation of 250 to 600% and a hardness of 50 to 90 degree (Shore hardness A), preferably a tensile strength of 80 to 120 $kg/cm^2$, a breaking elongation of 350 to 500% and a Shore hardness A of 60 to 80 degree.

Figure 4:
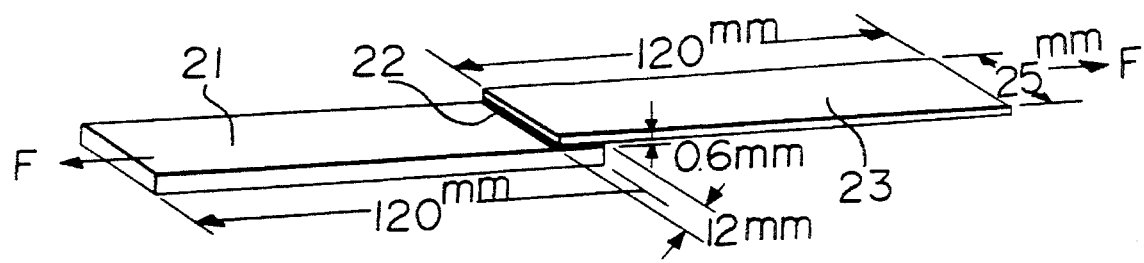
FIG. 4 is an explanation diagram illustrating a method for a shear test.

A shear strength of an adhesive composition measured by a shear test method wherein a test sample prepared by bonding a glass plate 21 to a metal plate 22 with the film-like or sheet-like adhesive composition is drawn downwardly, as shown in FIG. 4, is in the range from 40 to 90 $kg/cm^2$, preferably from 50 to 80 $kg/cm^2$.

The silicone rubber adhesive film or sheet of the present invention suitable for bonding an inner mirror base, preferably has a thickness in the range from 0.4 mm to 1.5 mm, more preferably from 0.6 to 1.0 mm. If the thickness of the adhesive film or sheet is not more than 0.4 mm, the adhesive composition can not absorb an internal stress generated by thermal expansion difference between the glass plate and the inner mirror base metal, thus leading to the breakage of the adhesive composition. On the contrary, if the thickness of the adhesive film or sheet is not less than 1.5 mm, the mirror installed thereby trembles during driving due to the elasticity of the adhesive composition, thus leading to poor backward visibility.

Examples of the base material for the mirror base 4 include iron, stainless steel (SUS304, SUS430), nickel-plated iron, iron baking-finished with thermosetting varnish such as thermosetting urethane varnish or the like, zinc-plated iron, die-cast zinc, die-cast zinc plated with nickel, die-cast zinc plated with a thermosetting varnish such as thermosetting urethane varnish or the like, polysulfone resin (PPS), FRP, nylon resin and the like.

When a flat plate-like mirror base is installed on the concave surface of a curved front glass of an automobile with a film-like or sheet-like adhesive, air remains in the central part of the adhered surface, thereby lowering the adhesive force and degrading the external appearance since the air bubbles are visible from the outside through the glass. In order to solve these problems, it is effective to provide the mirror base with such a convex bonding surface as to be fitted and bonded to the concave side surface of the glass plate by interposing a film-like or sheet-like adhesive between the convex bonding surface and the concave side surface of the glass plate.

Figure 5:
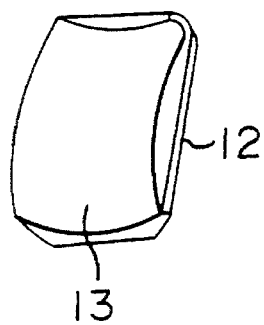
FIG. 5 is a perspective view illustrating the installed surface of a mirror base.

FIG. 5 illustrates a mirror base 12 having such a convex bonding surface 13 as to be fitted to the concave side surface of a curved front glass plate.

Figure 6:
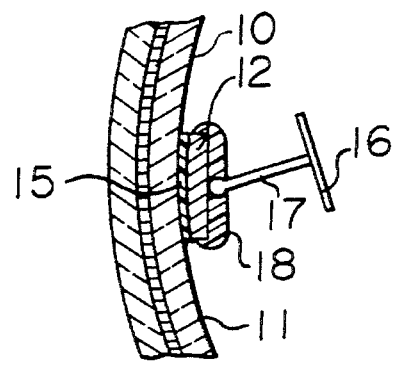
Figure 7:
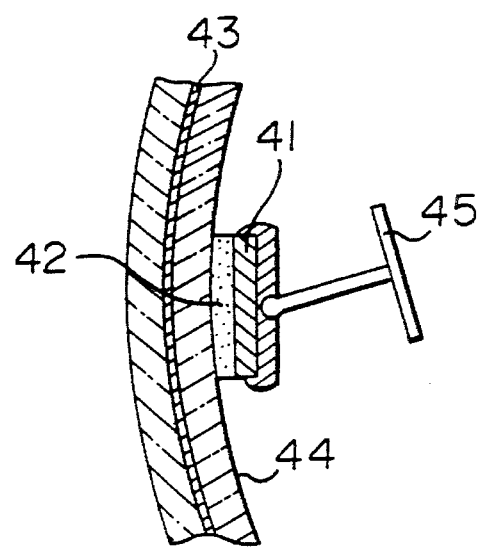
FIG. 7 is a sectional view illustrating the main part of the conventional mirror base-installing structure.

FIG. 6 is a vertical section view illustrating one embodiment of a mirror base-installing structure wherein the mirror base 12 is installed on the concave side surface 11 of a front glass 10 at the upper position of the inside of an automobile, said front glass 10 being composed of a bilayer glass prepared by bonding two sheets of curved glass plates with an intermediate film. The bonding between the bonding surface 13 and the concave side surface 11 of the front glass 10 is effected by a film-like adhesive 15 having a thickness of 0.6 mm, which comprises a thermo-cross linkable type silicone rubber. The mirror base may be press-molded to form such a convex bonding surface as to be fitted to the curved shape of the front glass 11, or may be subjected to die-casting using die-casting zinc, sintered alloy or the like to provide such a convex bonding surface 13 as to be fitted to the curved shape of the front glass 11, or may be subjected to abrasive agent-processing, abrasive processing or the like to provide the convex surface shape.

When the mirror base having the above-mentioned shape is bonded to the concave side surface of the curved glass plate with a film-like or sheet-like adhesive, the bonding surface of the mirror base is intimately bonded to the concave side surface of the glass plate through the film-like or sheet-like adhesive without generating air bubbles in the bonding part since the bonding surface of the mirror base has such a convex shape as to be fitted to the concave side surface of the curved glass plate, thus preventing the adhesive force and external appearance from degrading due to the presence of the air bubbles.

The following experimental examples illustrate the difference in the effect on the bonding state of the mirror bases in accordance with the present invention and the prior art. Table 1 shows physical properties of cross-linked adhesives used in the above experiments.

TABLE 1

| Physical property values of adhesive | EVA | Silicone rubber | PVB |
|---|---|---|---|
| Hardness (JIS-A) | 65 | 60 | 67 |
| 50% Modulus (kg/cm$^2$) | 30 | 20 | 25 |
| Tensile strength (kg/cm$^2$) | 200 | 220 | 190 |
| Elongation (%) | 500 | 770 | 475 |

A stainless steel (SUS430) sample having a size of 40×40 mm was used as a mirror base.

EXAMPLE 1

A laminate prepared by placing an EVA film on the central part of a glass plate of 100×100 mm (5 mm thickness) and further placing a mirror base thereon was placed in an autoclave (condition: temperature 150° C., pressure 13 kg/cm$^2$) to firmly bond each other.

EXAMPLE 2

A laminate prepared by placing a silicone rubber film on the central part of a glass plate of 100×100 mm (5 mm thickness) and further placing a mirror base thereon was placed in an autoclave (condition: temperature 130° C., pressure 13 kg/cm$^2$) to firmly bond each other.

COMPARATIVE EXAMPLE 1

A laminate prepared by placing a PVB film on the central part of a glass plate of 100×100 mm (5 mm thickness) and further placing a mirror base thereon was placed in an autoclave (condition: temperature 130° C., pressure 13 kg/cm$^2$) to firmly bond each other.

Each laminate sample thus prepared under the above-mentioned condition was subjected to various aging tests as shown in the left column of Table 2.

Figure 3:
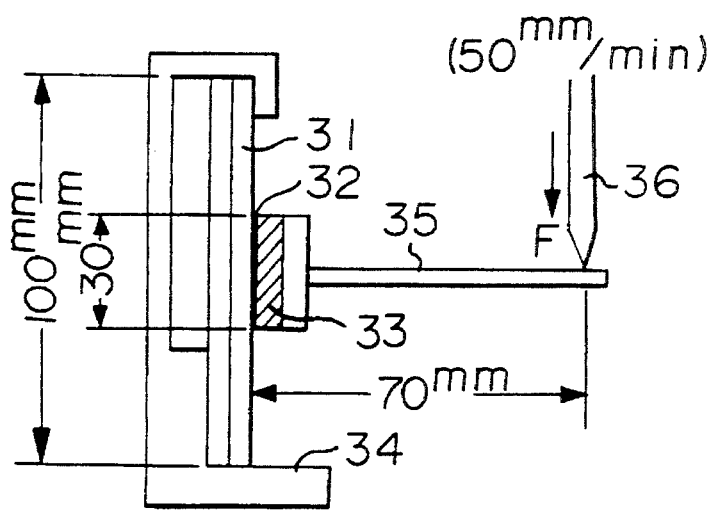
FIG. 3 is an explanation diagram illustrating a method for a bending strength test.

After the aging test, each laminate sample was subjected to a breaking strength test as shown in FIG. 3, wherein the glass plate 31 having the mirror base 33 bonded therewith by the adhesive 32 was supported by a glass plate supporting frame 34 and the mirror base 33 is firmly attached with a supporting rod 35, a pushing pressure of 50 mm/min being applied to the supporting rod 35 at the position of 70 mm horizontally apart from the surface of the glass plate 31. The test results are shown in the right column of Table 2.

TABLE 2

Aging test method and breaking strength

| Test Items | Test conditions | Adhesives and breaking strength (kg) | | |
|---|---|---|---|---|
| | | Ex. 1 | Ex. 2 | Ex. 3 |
| Initial strength | at normal temperature of 22° C. | 87.5 | 60.0 | 83.1 |
| | at hot temperature of 80° C. | 80.0 | 59.0 | 10.5 |
| Mositure-resistance | Exposed at 50° C., RH of 95% for 30 days | 52.3 | 61.0 | 20.7 |
| Accelerated durability | Exposed sunshine type weather-ometer for 1,000 hours | 90.0 | 67.8 | 77.5 |

As can be seen from the test results in Table 2, the breaking strength of the test sample of the Comparative Example prepared in accordance with the conventional method was remarkably lowered after high temperature and moisture-resistance aging test. On the other hand, it was confirmed that each test sample of Examples 1 and 2 of the present invention had excellent heat-resistance and humidity-resistance and its breaking strength was not largely lowered.

EXAMPLE 3

A film having a thickness of 0.6 mm molded from a composition comprising (A) Component: dimethylsiloxane-methylvinylsiloxane copolymer 60 wt %, (B) Component: methyl hydrogensiloxane-dimethylsiloxane copolymer 2 wt %, (C) Component: hydrophobic reinforcing silica 38.5 wt % (D) Component: γ-methacryloxypropyltrimethoxysilane 0.5 wt %, (E) Component: γ-glycidoxypropyltrimethoxysilane 0.5 wt %, (F) Component: glycerinmonoallylether 0.4 wt % and chloroplatinic acid 0.1 wt %, was attached to a stainless steel (SUS 430) base (20×30 mm). After laminating step of interposing an intermediate film between two sheets of glass plates, the above prepared base attached with the silicone film was press-bonded to the bilayer glass at the predetermined part by hand. Thereafter, this laminate product was sealed in a rubber bag which was evacuated to 500 mmHg, and it was allowed to stand in the atmosphere of 90° C. under this circumstances for 10 minutes to be preliminarily press-bonded. Predetermined sheets of the laminate products thus obtained were vertically placed on a track in an autoclave of the atmosphere of a temperature of 130° C. and a pressure of 13 kg/cm$^2$ to firmly bond the bilayer glass and to cure-bond the silicone film.

EXAMPLE 4

Using the same base and the same silicone film having the same composition and the same thickness as in Example 3, the base having the silicone film attached thereto at 20° C. was press-bonded by hand to the predetermined part of a bilayer glass laminate product after subjected to a preliminary press-bonding step. Subsequent steps were the same as in Example 3.

Comparative Examples 2 and 3 were carried out in accordance with the same steps as in respective Examples 3 and 4, except that comparative samples were prepared by press-bonding (5 kg load for 5 seconds) the same base with polyvinyl butyral (PVB) having a thickness of 20 mil heated at 100° C.

30 sheets of each sample were prepared by using silicone and PVB respectively as in Examples 3 and 4, and there was no sample wherein a base fell off from a glass plate till the end of the autoclave processing step. The bilayer glass having the mirror base attached therewith as mentioned above was cut into a size of 10 cm×10 cm, and was subjected to various adhesive durability tests.

The test results are shown in the following Table. As can be seen from this Table, the samples of this invention prepared by using the silicone rubber type sheet-like adhesive have a satisfactory adhesive force and a sufficient durability.

| Examples and Comparative Examples | | Durability test items and breaking strength (kg) *1 | | | | |
|---|---|---|---|---|---|---|
| | | 20° C. atmosphere | 80° C. atmosphere | Bathed in water of 50° C. for 30 days | Exposed to atmosphere of 80° C. for 30 days | Exposed to*² weather-ometer test for 2,000 hrs |
| Example 3 | Silicone | 65 | 55 | 60 | 67 | 59 |
| Comparative Example 2 | PVB | 73 | 5 | 8 | 68 | 75 |
| Example 4 | Silicone | 63 | 56 | 59 | 66 | 67 |
| Comparative Example 3 | PVB | 72 | 4 | 6 | 70 | 73 |

According to the present invention, a mirror base can be bonded simultaneously with the preparation of a bilayer glass, thereby simplifying the working process, and the bonding state of the mirror base bonded to the surface of the glass plate is more strengthened than in the conventional case in respect of heat-resistance, moisture-resistance and durability. Moreover, since the adhesive used is transparent, the mirror base itself can be an appealing point on the external view without spoiling the external appearance.

Particularly, when the film-like or the sheet-like adhesive comprising the above-mentioned silicone rubber composition is used as an adhesive for an inner mirror-installing base, it maintains the initial thickness in the atmosphere of a temperature of 130° C. and a pressure of 13 kg/cm² in an autoclave used in the preparation of a bilayer glass. Therefore, the adhesive does not protrude from the periphery of the mirror base, thereby providing a merit of omitting a finishing process.

Furthermore, the adhesive is thermosettable, and there is therefore no fear that the adhesive strength is remarkably lowered in the atmosphere of a high temperature like polyvinyl butyral film. Still further, as the adhesive maintains its elasticity even at a low temperature, there is no fear that the mirror falls off by vibrations during driving at a low temperature. The adhesive also has a good ultraviolet ray-resistance, and it is therefore unnecessary to protect the bonding face of the glass plate from the ultraviolet ray with a colored ceramic color frit baking layer as in the case of using a urethane adhesive.

It was recognized that materials other than SUS 430 could be used as a mirror base material, examples of which include metallic materials such as SUS 340, nickel-plated, zinc die-cast, zinc-plated, bake-finished steels or the like, and plastics such as polycarbonate resin, polyacetal, nylon 6, polyphenylene sulfone resin, glass reinforced polyester resin or the like.

We claim:

1. An apparatus comprising a glass plate and a mirror base wherein said mirror base is bonded to said glass plate by a film or sheet of thermosetting heat-curable adhesive interposed between the mirror base and the glass plate, said adhesive having elasticity or plasticity after heat-curing and is cross-linkable at a temperature from 50° C. to 200° C. within from 5–60 minutes, said adhesive having the following physical properties after cross-linking:

hardness (JIS-A): from 30–90, modulus at the elongation of 50% tensioned by dumbbell (ASTMD-1822) from 5–50 kg/cm², breaking strength: from 30–400 kg/cm², and breaking elongation from 100–1000%.

2. The apparatus of claim 1, wherein said adhesive is comprised of a cross-linkable composition comprising:

(a) an organopolysiloxane having at least two alkenyl groups bonded to silicon atoms per molecule;

(b) an organohydrogenpolysiloxane having at least two hydrogen atoms bonded to silicon atoms per molecule, in an amount to provide a molar ratio of hydrogen atoms bonded to silicon atoms in (B)/alkenyl groups bonded to silicon atoms in (A) in the range of from 0.5 to 5/1;

(c) wet process hydrophobic reinforcing silica having a specific surface area of at least 200 m²/g, said silica comprising $SiO_2$ units and organosiloxane units selected from the group consisting of $R_3SiO_{1/2}$ units, $R_2SiO$ units, $RSiO_{3/2}$ units and a mixture thereof, wherein each R is a substituted or non-substituted monovalent hydrocarbonyl group, said silica having a molar ratio of organosiloxane units/$SiO_2$ units of from 0.08 to 2.0, said silica being present in an amount of 30 to 150 parts by weight/100 parts by weight of (A);

(D) an acryl-functional silane coupling agent or a methacryl-functional silane coupling agent, in an amount of from 0.05 to 10 parts by weight/100 parts by weight of (A);

(E) an epoxy-functional silane coupling agent, in an amount of from 0.05 to 10 parts by weight/100 parts by weight of (A);

(F) a partially allyl etherified polyhydric alcohol, in an amount of from 0 to 5 parts by weight/100 parts by weight of (A); and (G) a catalytically effective amount of a platinum compound catalyst.

3. The apparatus of claim 1, wherein said adhesive has the following physical properties in the atmosphere of 20° C.:

Tensile strength by dumbell No. 3 (JIS K6301): from 80 to 120 kg/cm²,

Breaking elongation: from 250 to 600%,

Shore hardness: from 50 to 90 kg/cm², and

Shear strength: from 40 to 90 kg/cm².

4. The apparatus of claim 1 wherein said adhesive is prepared by molding a silicone rubber composition into a film or sheet.

5. The apparatus of claim 1 wherein said glass plate has a curved surface, on the concave side surface of which the mirror base is installed, and said mirror base has such a convex bonding surface as to be fitted and bonded to the concave side surface of said glass plate with said adhesive interposed between the convex bonding surface and the concave side surface of said glass plate.

* * * * *